United States Patent [19]

Cavanaugh et al.

[11] Patent Number: 5,311,697
[45] Date of Patent: May 17, 1994

[54] APPARATUS FOR REDUCING THE POPULATION OF FLYING INSECTS

[76] Inventors: Martin P. Cavanaugh; William P. L. Cavanaugh, both of 10901 Sidney Pl., Garden Grove, Calif. 92640

[21] Appl. No.: 998,127

[22] Filed: Dec. 29, 1992

[51] Int. Cl.$^5$ .................. A01M 1/02; A01M 1/04; A01M 1/14
[52] U.S. Cl. .................. 43/132.1; 43/107; 43/113; 43/114
[58] Field of Search .................. 43/132.1, 107, 122, 43/138, 139, 113; 119/74

[56] References Cited

U.S. PATENT DOCUMENTS

| | | | |
|---|---|---|---|
| 986,775 | 3/1911 | Smith | 119/74 X |
| 2,129,275 | 9/1938 | Hartzell et al. | 43/132.1 X |
| 3,487,577 | 1/1970 | Sexton | 43/132.1 X |
| 4,086,720 | 5/1978 | Wiser | 43/113 |
| 4,802,303 | 2/1989 | Floyd, III | 43/114 X |
| 4,961,282 | 10/1990 | Hoppe | 43/114 |
| 5,020,270 | 6/1991 | Lo | 43/112 |
| 5,048,224 | 9/1991 | Frisch | 43/132.1 X |
| 5,189,831 | 3/1993 | Miller et al. | 43/132.1 X |

Primary Examiner—Mark Rosenbaum
Assistant Examiner—Jeanne M. Elpel

[57] ABSTRACT

An apparatus is provided for reducing the population of flying insects. A first transparent cylindrical container is oriented with its axis generally vertical and provides a plurality of storage shelves for holding an insect bait. Natural air convection currents flowing over the bait produce an insect-attracting scent in the vicinity of the apparatus for attracting insects to the apparatus. A second transparent cylindrical container provides a space for containing a liquid defatting agent, and has an open top lip so that the liquid may spill over the lip and run downward across the outer surface of the second container. A storage container is positioned below the second container to receive the liquid that spills over the top lip. A pump is interconnected between the storage container and the second container so as to pump the liquid from the storage container to the second container, over the top lip, and back to the storage container in a continuous process. A screen for covering the top of the storage container is included so that the liquid may pass through the screen while excluding disabled insects. The first container may further include a pole clamp so that the apparatus may be positioned coaxially onto the pole and positioned at a selected location on the pole. The first container may further include at least one light and one sound reproducing means for further attracting insects. A fan may be mounted in the first container to blow air across the bait for producing the insect attracting scent. Optionally, at least one insect attracting decal may be included on the inside surface of the wall of the second container. The apparatus may include a self contained storage battery, or a connector for being powered by an external power source.

15 Claims, 3 Drawing Sheets

APPARATUS FOR REDUCING THE POPULATION OF FLYING INSECTS

FIELD OF THE INVENTION

This invention relates generally to insect population control devices, and, more particularly, is directed toward an insect control device that does not rely on large-scale poison spraying.

BACKGROUND OF THE INVENTION

Several different insect traps exist in the prior art. Many such devices utilize various poisonous substances to kill such insects upon contact. Other devices use a strong adhesive that traps insects in place, thereby eventually killing them. Other devices simply trap insects in a container that must be emptied periodically, for example, into a toilet or other disposal means. Clearly, with such devices, care must be given not to let such insects escape while emptying the device. Recently, several prior art insect killing devices have utilized a strong electric field into which insects fly and are electrocuted.

Public attention has recently become more focused on the over utilization of insecticides, toxic chemicals, and the like. Such chemicals are now being shown to cause significant harm when exposed to the environment. As such, many people are becoming reluctant to use devices that spray poisonous substances, such as many insect controlling devices. People with small children are even more reluctant to purchase such devices. For example, U.S. Pat. No. 4,802,303 to Floyd on Feb. 7, 1989, discloses such a device.

On the other hand, prior art insect control devices that do not use poisonous substances are generally perceived as less effective or more unsanitary than those devices that do contain poisonous substances. For example, those devices that utilize a strong adhesive become, over time, ridden with dead insects. Such devices are not only unsightly, but are arguably unsanitary. Further, strong adhesives of such devices tend to become less effective after exposure to air for an extended period of time. As such, insects that approach such a device may become repelled from it due to the olfactory recognition of other dead insects, or may, in fact, be able to escape when caught by a weak adhesive.

Clear disadvantages are also evident in insect traps that require periodic emptying of a reservoir for catching dead insects. Not only is such a chore distasteful, over time such reservoirs tend to become unsanitary if not properly cleaned. Further, many insects may be repelled from such a device that has not been emptied for some time.

Clear disadvantages are also evident in insect traps that use electricity to electrocute flying insects. Such insects typically fly between two screens that are oppositely charged, whereby an electric arc travels through the insect from one screen to the other, electrocuting the insect. Such an electric arc tends to make an unpleasant, sometimes startlingly load noise. Moreover, many people with small children are reluctant to use any apparatus with high voltage for obvious reasons. Such electric devices, moreover, are difficult to mount on a vertical pole, such as a fence post or the like. Mounting such devices from a pole is often more convenient than finding a tree branch or other such horizontal support near an electrical outlet.

Clearly, then, there is a need for an insect killing device that remains effective over extended periods of time without using wide-spread poisonous substance spraying. Such a needed device would be extremely alluring to flying insects, and extremely effective in killing them, yet would not require periodic cleaning or removing of dead insects. Further, such a needed device would be easy to maintain, would be pleasant in appearance, and would not create loud and unpleasant sounds. The present invention fulfills these needs and provides further related advantages.

SUMMARY OF THE INVENTION

The present invention is an apparatus for reducing the population of flying insects. A first transparent inner cylindrical container is oriented with its axis generally vertical and provides a plurality of storage shelves for holding an insect bait. Natural air convection currents flowing over the bait produce an insect-attracting scent in the vicinity of the apparatus for attracting insects to the apparatus. A second transparent outer cylindrical container provides a space for containing a liquid defatting agent, and has an open top lip so that the liquid may spill over the lip and run downward across the outer surface of the second container. A storage container is positioned below the second container to receive the liquid that spills over the top lip. A pump is interconnected between the storage container and the second container so as to pump the liquid from the storage container to the second container, over the top lip, and back to the storage container in a continuous process. A screen for covering the top of the storage container is included so that the liquid may pass through the screen while excluding disabled insects. The first container may further include a means for mounting onto a pole so that the apparatus may be positioned coaxially onto the pole and positioned at a selected location on the pole. The first container may further include at least one light for further attracting insects. A fan may be mounted in the first container to blow air across the bait for producing the insect attracting scent. Optionally, at least one insect attracting indicia, such as a decal, may be included on the inside surface of the wall of the second container. Moreover, a sound generating means may be provided for producing insect attracting sounds, such as mating sounds for specific insects. An appropriate power source, such as a self contained storage battery or a power connector for an external power source, is included to power the fan, the lights, the pump, and the sound generating means.

In operation, insects are attracted to the apparatus by the scent of the bait, which may include insect pheromones, food products, and blood. The bait may also be dissolved in the liquid defatting agent. Lighting, backlit decal images, and sound attractants also attract the insects. The insects contact the liquid that flows over the outer surface of the second container and are consequently destroyed by the defatting agent or surfactant. Dead or disabled insects then impact the screen and roll off the apparatus to the soil or ground below the device. The device may be controlled locally by manual power switching means, or can be remotely controlled by a radio control switching means.

The present invention remains effective over extended periods of time without the spraying of poisonous substances. The present invention is extremely alluring to flying insects through use of visual, aural, and olfactory attractants. The present invention is also effective in killing such insects, yet does not require periodic cleaning or removing of dead insects from collection reservoirs found in many prior art devices. Further, the present invention is easy to maintain, is pleasant in appearance, and does not create loud and unpleasant sounds. Further, the present invention is easily mounted on a vertical pole, or the like. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
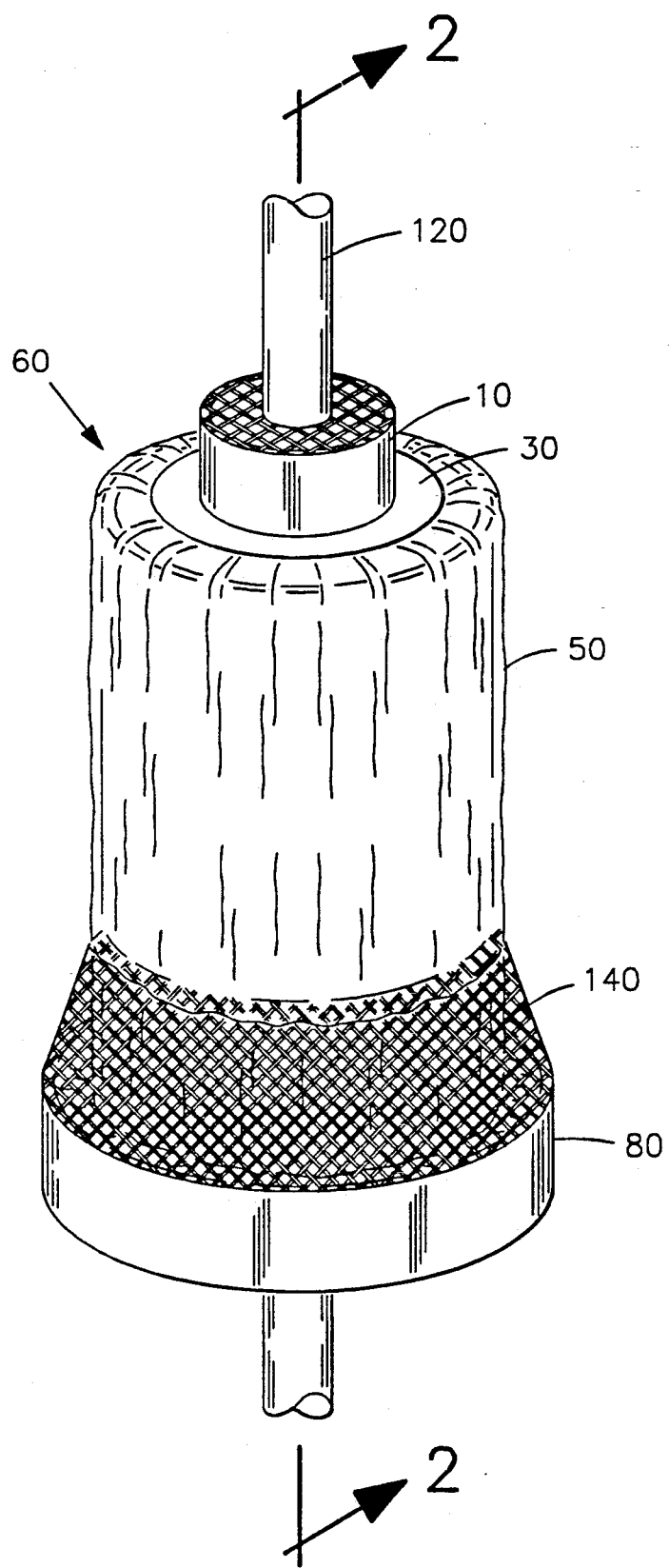
FIG. 1 is a perspective illustration of the invention, illustrating the invention as mounted on a pole.
Figure 2:
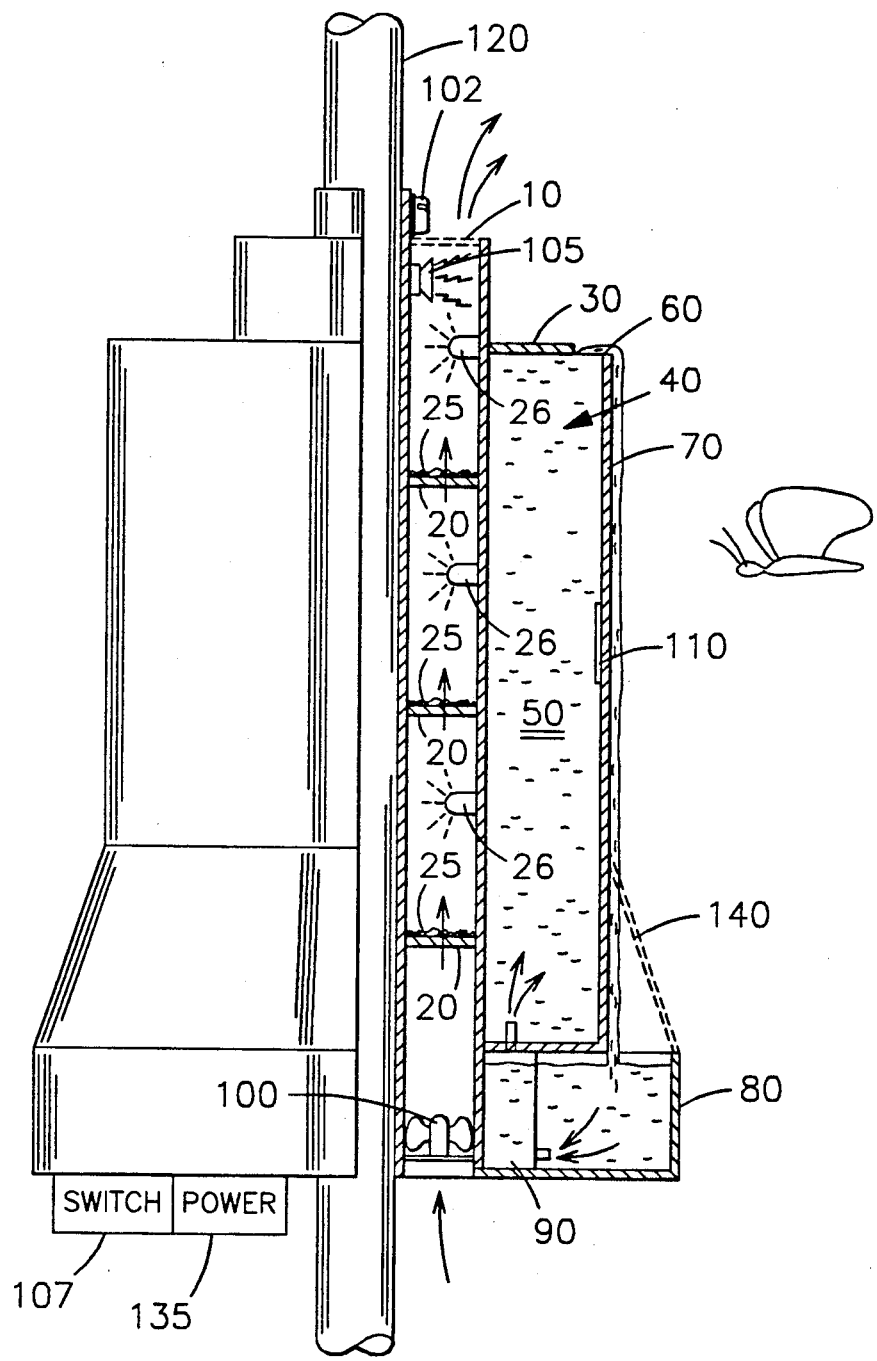
FIG. 2 is a cross-sectional view of the invention, illustrating a first and second cylindrical containers of the invention.

FIGS. 1 and 2 show an apparatus for reducing the population of flying insects. A first cylindrical container 10 is oriented with its axis generally vertical and provides a plurality of storage shelves 20 for holding an insect bait 25, such as pheromones and pieces of fruit or food. Natural air convection currents produce an insect attracting scent in the vicinity of the apparatus for attracting insects to the apparatus. A second cylindrical container 30 provides a space 40 for containing a liquid defatting agent 50 and has an open top lip 60 so that the liquid may spill over the lip 60 and run downward across the outer surface 70 of the second container 30. A storage container 80 is positioned below the second container 30 to receive the liquid 50 that spills over the top lip 60. In one embodiment of the invention, the liquid defatting agent 50 may include a surfactant agent, such as soap, or the like. Such defatting agents 50 allow water to enter the breathing tracheas of insects, thereby killing them through oxygen deprivation.

Figure 3:
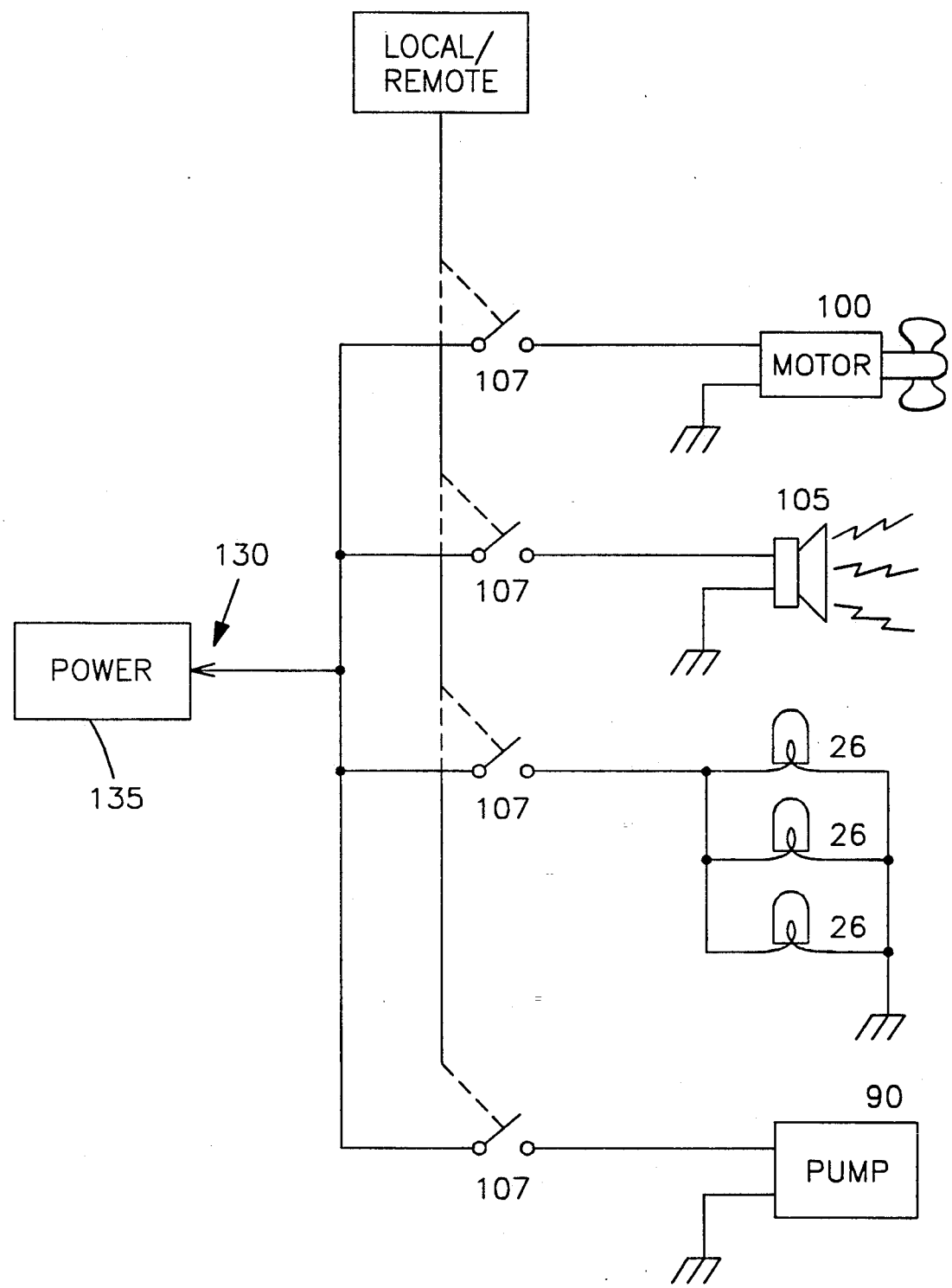
FIG. 3 is a schematic diagram of electrical components of the invention.

A pump 90 is interconnected between the storage container 80 and the second container 30 so as to replace liquid 50 in the second container 30 so that the liquid 50 moves from the storage container 80 to the second container 30, over the top lip 60, and back to the storage container 80 in a continuous process. A screen 140 for covering the top of the storage container 80 is included so that the liquid 50 may pass through the screen 140. Disabled insects cannot pass through the screen 140. The screen 140 may be positioned at an angle such that insects roll off of the screen 140, and onto the soil or ground immediately below the apparatus. In one embodiment of the invention, the first container 10 includes a pole mounting means 102 (FIG. 2) so that the apparatus may be positioned coaxially onto the pole 120 and positioned at a selected location on the pole 120. Clearly, more than one such apparatus may be mounted on the same pole 120 to provide for more effective insect control. Alternately, the length of the apparatus may be increased as necessary to provide varying degrees of insect control effectiveness. The pump 90 may further include an anti-siphon valve (not shown) so that when the pump 90 is off, liquid 50 does not spin out of the storage container 80 or backflow out of the second container 30 into the storage container 80 through the inactive pump 90. Preferably, the first container 10 and the second container 30 are made from a transparent material, such as acrylic or other plastic. The first container 10 may further include at least one light 26 for further attracting insects. In one embodiment of the invention, multiple lights 26 are used and may flash on and off in various patterns. A fan 100 may further be mounted in the first container 10 to blow air across the bait 25 for producing the insect attracting scent. Optionally, at least one insect attracting indicia 110, such as a removable decal, may be included on the inside surface of the wall of the second container 30. Such an indicia 110 may illustrate various fruits, other insects, plants, or the like. Further, a sound generating means 105 may be provided for producing insect attracting sounds. An appropriate power source, such as a self contained storage battery 135 or a power connector 130 for an external power source, is included to power the fan 100, the lights 26, the pump 90, and the sound generating means 105. Local control switches (FIG. 3) may be included to activate the fan 100, the lights 26, the pump 90, and the sound generating means 105. A remote actuation means may also be included, comprising an electrical switch 107 with a radio receiver, and a radio transmitting switch (not shown), so that power to the apparatus may be switched remotely. For example, such a radio transmitting switch could be activated from indoors, without the need to go outside to manually activate the device.

In operation, insects attracted to the apparatus by the scent of the bait 25 may contact the liquid 50 that flows over the outer surface 70 of the second container 30, and thereby be destroyed by the defatting agent 50. Such dead or disabled insects then roll off the screen 140 and onto the ground immediately below the apparatus. The bait 25 may include pheromones, food products, and blood. Optionally, the bait 25 may be dissolved in the liquid defatting agent 50 for producing the scent as the liquid 50 flows down the outer surface 70 of the second container 30.

While the invention has been described with reference to a preferred embodiment, it is to be dearly understood by those skilled in the art that the invention is not limited thereto. Rather, the scope of the invention is to be interpreted only in conjunction with the appended claims.

I claim:

1. An apparatus for reducing the population of flying insects comprising:
    a first cylindrical container oriented with the axis vertical and providing a plurality of storage shelves each holding an insect bait, natural air convection currents producing an insect attracting scent in the vicinity of the apparatus for attracting insects to the apparatus;
    a second cylindrical container mounted externally to, and coaxially with the first container for providing a space in which is held defatting agent and having an open top lip so that the liquid may spill over said lip to run downward across the outer surface of the second container;
    a storage container positioned below the second container to receive the liquid that spills over the top lip;
    a pump interconnected between the storage container and the second container to replace liquid in the second container so that the liquid moves from the storage container to the second container over the top lip and back to the storage container in a continuous process whereby insects attracted to the apparatus by the scent may contact the liquid moving over the outer surface of the second container so that they are destroyed by the defatting agent.

2. The apparatus of claim 1 further including an electrical power source for providing power to the apparatus.

3. The apparatus of claim 2 wherein the power source is a self contained storage battery.

4. The apparatus of claim 2 wherein the power source is positioned at a remote location, and further including an electrical connector for connecting the power source to the apparatus.

5. The apparatus of claim 2 further including a fan mounted in the first container for blowing air across the bait for producing the insect attracting scent, the fan being connected to the power source for deriving energy.

6. The apparatus of claim 2 wherein the walls of the first and the second cylinders are transparent, the first cylinder further including at least one light for attracting insects at night, the light being connected to the power source for deriving energy.

7. The apparatus of claim 1 further including at least one insect attracting indicia on the inside surface of the wall of the second cylinder.

8. The apparatus of claim 7 wherein the at least one indicia is a removable decal.

9. The apparatus of claim 1 wherein the first container has means for mounting onto a pole so that the apparatus may be positioned coaxially onto the pole and positioned at a selected location on the pole.

10. The apparatus of claim 1 further including a screen for covering the top of the storage container so that the liquid may pass through the screen while excluding disabled insects.

11. The apparatus of claim 10 wherein the screen is positioned at an angle so that insects will roll off the screen.

12. The apparatus of claim 2 further including a remote actuation means including a radio control means and a radio receiving electrical switch so that power to the apparatus may be switched remotely.

13. The apparatus of claim 2 further including a sound generating means for producing sounds for attracting insects, the generating means being interconnected with the power source.

14. The apparatus of claim 1 wherein the bait is selected from the group including, pheromones, food products, and blood.

15. The apparatus of claim 1 wherein bait is dissolved in the liquid defatting agent for producing the scent due to the liquid movement in running down the outer surface of the second container.

* * * * *